(12) United States Patent
Raniere (10) Patent No.: US 9,179,247 B2
(45) Date of Patent: Nov. 3, 2015

(54) SYSTEMS AND METHODS FOR LOCATING A MOBILE COMMUNICATION DEVICE

(71) Applicant: FIRST PRINCIPLES, INC., Albany, NY (US)

(72) Inventor: Keith A. Raniere, Clifton Park, NY (US)

(73) Assignee: FIRST PRINCIPLES, INC., Albany, NY (US)

( * ) Notice: Subject to any disclaimer, the term of this patent is extended or adjusted under 35 U.S.C. 154(b) by 76 days.

(21) Appl. No.: 13/841,310

(22) Filed: Mar. 15, 2013

(65) Prior Publication Data

US 2014/0274121 A1 Sep. 18, 2014

(51) Int. Cl.
| | |
|---|---|
| H04M 11/04 | (2006.01) |
| H04W 24/00 | (2009.01) |
| H04M 3/00 | (2006.01) |
| H04M 3/16 | (2006.01) |
| H04M 1/66 | (2006.01) |
| H04M 1/68 | (2006.01) |
| H04W 4/02 | (2009.01) |
| G01S 19/16 | (2010.01) |
| G01S 19/34 | (2010.01) |

(52) U.S. Cl.
CPC .............. *H04W 4/02* (2013.01); *G01S 19/16* (2013.01); *G01S 19/34* (2013.01)

(58) Field of Classification Search
CPC .............. G01S 19/17; H04L 12/5865; H04M 1/72541; H04M 2250/10; H04W 4/02; H04W 4/185; H04W 4/22; H04W 76/007
USPC .............. 455/404.2, 456.3, 418, 456.2, 411
See application file for complete search history.

(56) References Cited

U.S. PATENT DOCUMENTS

| | | |
|---|---|---|
| 6,297,737 B1 | 10/2001 | Irvin |
| 6,397,088 B1 | 5/2002 | Roo |
| 6,606,504 B1 | 8/2003 | Mooney et al. |
| 6,662,023 B1 | 12/2003 | Helle |
| 6,677,895 B1 | 1/2004 | Holt |
| 6,771,954 B1 | 8/2004 | Yoneyama et al. |
| 6,782,251 B2 | 8/2004 | Kagay, Jr. |
| 7,103,367 B2 | 9/2006 | Adams et al. |
| 7,164,921 B2 | 1/2007 | Owens et al. |
| 2002/0186845 A1 | 12/2002 | Dutta et al. |
| 2004/0017293 A1 | 1/2004 | Webster |
| 2004/0110494 A1 | 6/2004 | Cohen et al. |
| 2004/0130448 A1 | 7/2004 | McDonald et al. |
| 2006/0252431 A1 | 11/2006 | Mullen |
| 2006/0258376 A1 | 11/2006 | Ewell, Jr. |
| 2007/0030164 A1 | 2/2007 | Lim |
| 2007/0052535 A1 | 3/2007 | Ranganath |

(Continued)

OTHER PUBLICATIONS

International Search Report and Written Opinion for PCT application No. PCT/US2014/023098, mailed on Jul. 15, 2014.

*Primary Examiner* — Opiribo Georgewill
(74) *Attorney, Agent, or Firm* — Schmeiser, Olsen & Watts, LLP (57) ABSTRACT

Systems and methods for communications systems and more particularly to systems and methods for locating a mobile communication device are disclosed. When attempting to locate a misplaced, lost or stolen mobile communication device, if the mobile communication device may be in the possession of another party, the mobile communication device may be remotely controlled such that remote operations are independent of the normal mobile communication device operations.

5 Claims, 6 Drawing Sheets

(56) References Cited

U.S. PATENT DOCUMENTS

| | | |
|---|---|---|
| 2007/0077924 A1 | 4/2007 | Bhogal et al. |
| 2007/0090947 A1 | 4/2007 | Adrian et al. |
| 2007/0281671 A1 | 12/2007 | Mullen |
| 2008/0039059 A1 | 2/2008 | Mullen |
| 2008/0320312 A1 | 12/2008 | Duffus et al. |
| 2010/0216429 A1 | 8/2010 | Mahajan |
| 2010/0216522 A1 | 8/2010 | Bennis et al. |
| 2010/0273452 A1* | 10/2010 | Rajann et al. .................. 455/411 |
| 2011/0070898 A1 | 3/2011 | Sanjeev et al. |
| 2011/0145927 A1* | 6/2011 | Hubner et al. .................. 726/26 |
| 2011/0319051 A1* | 12/2011 | Reitnour .................... 455/404.2 |
| 2012/0196571 A1* | 8/2012 | Grkov et al. .................. 455/411 |

* cited by examiner

SYSTEMS AND METHODS FOR LOCATING A MOBILE COMMUNICATION DEVICE

FIELD OF THE TECHNOLOGY

The present disclosure relates generally to communications systems and more particularly to systems and methods for locating a mobile communication device.

BACKGROUND OF THE DISCLOSURE

Mobile communication devices such as mobile cellular telephones have become one of the primary means of communication used today. Throughout the world, the mobile cellular telephones and other mobile communication devices provide people, businesses, governmental agencies and virtually all other entities with the capability to instantly communicate with each other. In particular, the mobile cellular telephone has evolved from a device that is simply used for verbal communication to a device that is used to transmit video and text messages, access the World Wide Web and watch television.

Accordingly, a system and method for locating a mobile communication device would be well received in the art.

SUMMARY

According to one aspect, a method for locating a mobile device comprising activating a management application such that an owner is enabled to remotely control an operational mode of the mobile device, remotely activating a location application on the mobile device, obtaining a location of the at least one mobile device with the location application, and transmitting the location of the mobile device to the owner, is provided.

According to another aspect, a mobile communication device comprising a transceiver, a locator system configured obtain a location of the communication device, and a structure in communication with the locator system capable of receiving a location request from a remote device and transmitting the location of the communication device to the remote device without affecting the normal operation of the mobile communication device, is provided.

According to yet another aspect, a method for locating a mobile device comprising establishing a first communication with the mobile device, and activating, with the established first communication, a remote control structure operatively associated with the mobile device such that remote control of the mobile device is not detectable by a party in possession of the mobile device, is provided.

According to yet another aspect, a computer program product comprising instructions for establishing a remote communication with a mobile device, instructions for remotely actuating a power source of the mobile device, instructions for remotely taking control of the mobile device, instructions for validating an identity of a user attempting to establish communication with the mobile device, and instructions for determining the physical coordinates of the mobile device, is provided.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

A main means of communication today is the over air (OTA) communication systems. One particular communication system for MCDs is the mobile cellular telephone commonly known as a cell phone. The cell phone communicates over air with a communication tower that directs the call to the desired location. Today, a typical cellular phone network comprises a plurality of communication towers having conventional switching stations. A person can call a cell phone from any conventional telephone. The call may first be routed to the conventional switching station. Once it is determined that the called number may be a mobile communication cell phone, the call may be routed via communication from the switching station to the communication tower for that particular cellular telephone service provider. The communication tower then transmits the call via wireless signals to the identified number of the cell phone.

When a person misplaces their cell phone, a typical way to recover the device is to call the number of the cell phone. The ring tone of the cell phone may give the owner an indication of the cell phone location. Although this method of locating a misplaced cellular telephone works in many situations, the owner must be in the general vicinity of the cell phone in order to hear an audible ring tone emitted by the misplaced cell phone. If the cell phone may be in another location, this approach will not work. A second drawback to this approach may be that many people set the ring tone of the cell phone to vibrate or silent. This may be common practice when the owner does not want the ring tone to disturb other people. If the ring tone is set very low or is not audible, the owner will not be able to use this traditional approach to locate their misplaced cell phone.

In other approaches to recovering a lost cell phone, a cell phone owner may rely on good Samaritans to return their lost cell phone. A passerby who finds a cell phone may turn on the cell phone and if it does not have a password lock, they may look for owner information if the cell phone contains it. Otherwise, the passerby may call some people in the address book in an attempt to find the cell phone's owner. Other methods to locate the misplaced cell phone may involve calling the cell phone and seeing if anyone answers. If someone does answer and may be willing to talk to the owner the cell phone may be easily recovered.

Many times, a cell phone owner knows approximately where they left the cell phone or at least has a good idea of the location of the lost cell phone. In this case, the owner may return to that location, look around and call the cell phone to see if they can hear the cell phone's ring tone. Several problems with this method occur based on the following preconditions: (1) the cell phone must be turned on; (2) the cell phone must have enough of a charged battery to ring; (3) the cell phone must not be on silent or vibrate mode; (4) the cell phone must have a distinguishable ring.

According to the present disclosure, a mobile communications device, such as, for example, a cell phone, may include a feature that may be used when the cell phone may be either misplaced, lost or stolen and the cell phone battery may be dead or when the sound on the cell phone may be remotely controlled, although the scope of the disclosure is not limited in this respect. Normally, if a cell phone is turned on, an individual may call the cell phone and find the cell phone by hearing its ring, unless the cell phone may be on silence. The systems and methods of the present disclosure may include a system or device that may be independent of the cell phone being turned on or off. If an owner or an authorized individual calls either a special number or something similar, then the cell phone may ring or make a noise whether the cellular phone is powered or unpowered.

Another individual may want to be able to turn off the ring sound on the cell phone, but if a person dials into the cell phone's number and then enters a special code, then the person may override the cell phone ring sound being turned off and make the cell phone emit sounds. If the cell phone is stolen and in the possession of another party, the audible ring signal may be turned off and a different location method or device may be used to notify the owner. If the cell phone's battery dies, then the cell phone may include a feature such as an ancillary device that that may include a reserve or secondary power source. The reserve or secondary power source may provide a type of tracking. The ancillary device may include a tracer on the cell phone utilizing, for example, GPS.

An owner may always try to call the cell phone from another cell phone. When the owner calls the cell phone and enters a special code, the cell phone, where ever it may be located, may start operating in such a manner that loud sounds begin emitting from the cell phone such as, for example, the following: "Help! Help! I'm lost, reward if you return me to my owner."

Generally, if a stranger somewhere suddenly hears a cell phone ringing, the stranger may not pick up the cell phone. If a stranger is in a public place and an individual's lost cell phone is be ringing, the stranger may not go to pick up the ringing cell phone. In this situation, if the cell phone is not located, the battery may die and the cell phone may be lost. Thus, if the cell phone emits loud sounds like: "Help! Help! Reward, I'm lost," then a stranger may be more likely to pick up the cell phone.

In one specific embodiment, when the cell phone is in the possession of another party, the cell phone may be remotely controlled if the owner really does not want the other person to know that the owner may be trying to locate the cell phone. In one embodiment, this may be accomplished by a resident location application that enables an owner to remotely communicate with the cell phone such that the location application is activated and sends the cell phones present location to the owner.

As will be explained in more detail herein below, at least some of the systems and methods of the present disclosure may be effective in locating other misplaced, lost or stolen devices, such as, for example, a personal digital assistant (PDA) or a handheld portable communication device, a laptop or portable computer with communication capability, a web tablet, a pager, an instant messaging device, a digital camera, an access point or other device that may receive and transmit information.

Figure 1:
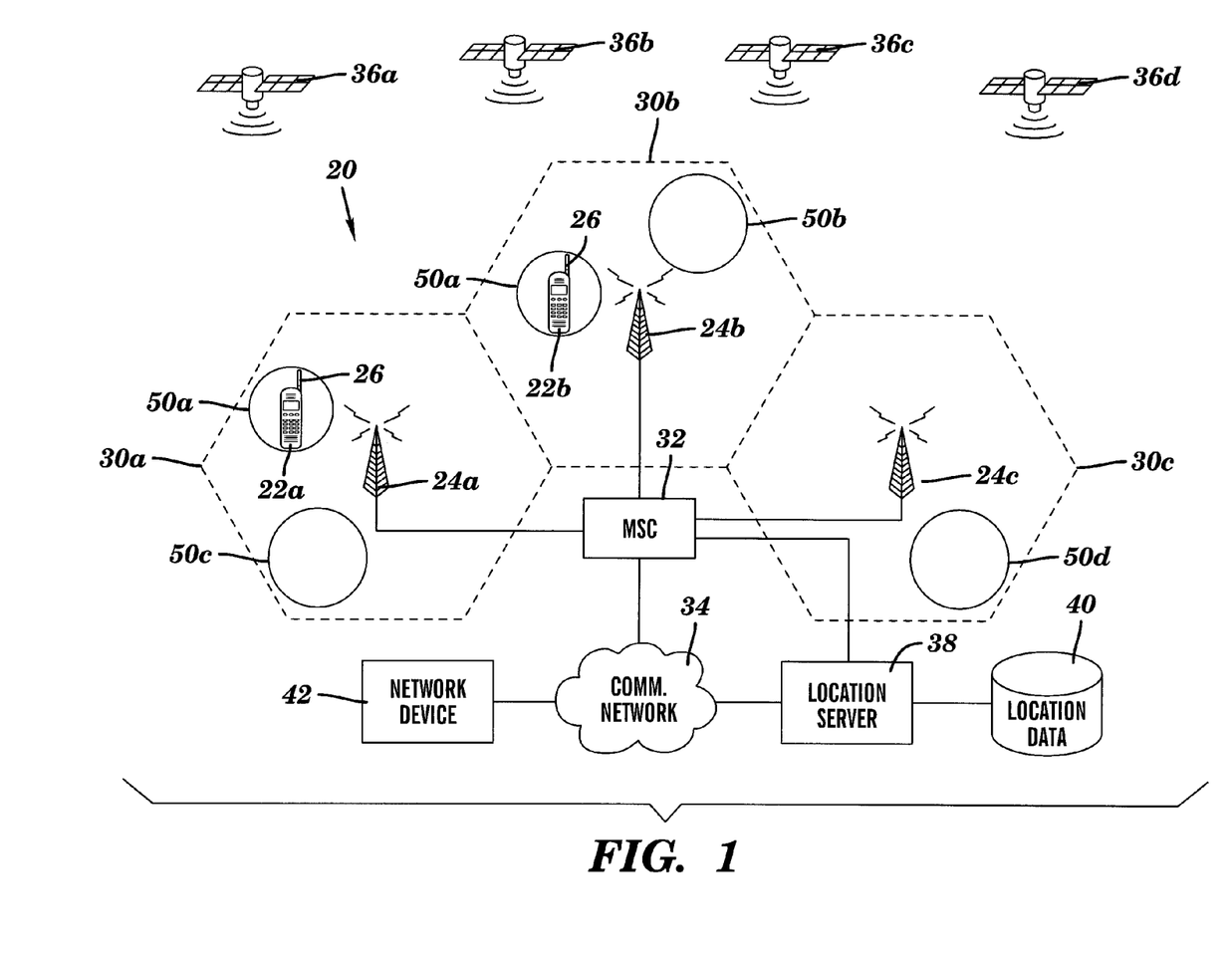
FIG. 1 depicts a representative communication system according to one embodiment.
Figure 2:
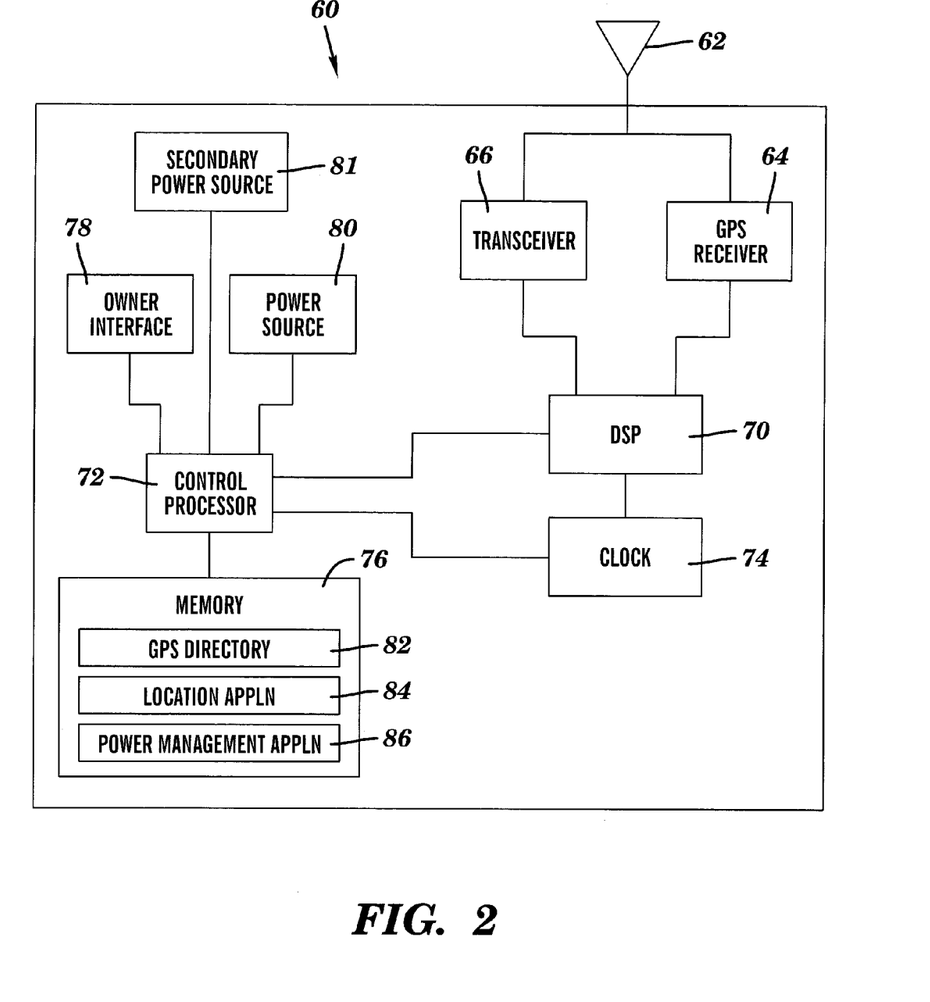
FIG. 2 depicts a block diagram of a representative mobile communications device according to one embodiment.

Referring now to FIGS. 1 and 2, a system 20 for locating a mobile communications device (MCD) 22 having a communication range and being capable of communicating with a communication structure such as communication towers 24a-c is shown. The device 22 may include structure, such as, for example, an antenna or a transceiver 66 operatively associated with the device 22 for sending and receiving wireless signals. The device 22 may include a plurality of possible locating communication systems including a mobile radio frequency device (M-RFID), a mobile item management and identification system (MMIM), a real time locating system (RTLS), a global positioning system (GPS), or any other structure known to those skilled in the art for locating objects using a transmitter, signal and receiver or other locator presently known or becomes known in the future to those skilled in the art.

Radiolocation may be one specific technique that may be utilized with the present disclosure and may be employed in a wide variety of industrial and military activities. Radar systems often use a combination of time of arrival (TOA) and angle of arrival (AOA) to determine a backscattering object's position using a single receiver. In Doppler radar, the Doppler shift may be also taken into account, determining velocity rather than location (though it helps determine future location). The Doppler shift concept may also be used by structure emitting sound waves. Real Time Location Systems RTLS are commercially available and may be used with the present disclosure. The widely-used Global Positioning System (GPS) may be based on TOA of signals from satellites at known positions and may be used with the present disclosure.

In one specific example of the utilization of radiolocation for locating a mobile cell phone may be based on cellular telephone communication system providers via communication towers 24 *a-c*, although the scope of the disclosure is not limited in this respect. Most often, radiolocation may be done through triangulation between communication towers, although the scope of the disclosure is not limited in this respect. The location of the device 22, such as for example, a cell phone or other MCD may be determined several ways: (1.) AOA requires at least two Towers, locating the caller or the cell phone at the point where the lines from each tower intersect; (2.) time difference of arrival (TDOA) and time of arrival (TOA) may function using multilateration, except that it may be the networks that determine the time difference and therefore distance from each tower (as with seismometers); (3.) location signature uses "fingerprinting" to store and recall patterns (such as multipath) which mobile cellular phone signals are known to exhibit at different locations in each cell of the particular cellular service provider, although the scope of the disclosure is not limited in this respect.

The first two may depend on a line-of-sight, which may be difficult or impossible in mountainous terrain or around skyscrapers, although the scope of the disclosure is not limited in this respect. Location signatures actually work better in these conditions however, although the scope of the disclosure is not limited in this respect. TDMA and GSM networks such as, for example, AT&T and T-Mobile use TDOA, although the scope of the disclosure is not limited in this respect. CDMA networks such as, for example, Verizon and Sprint PCS may use handset-based radiolocation technologies, which are technically more similar to radionavigation, although the scope of the disclosure is not limited in this respect. GPS may be one of those technologies, although the scope of the disclosure is not limited in this respect.

Composite solutions, needing both the cell phone and the network include, but are not limited to, assisted GPS (or TV) allows use of GPS even indoors; Advanced Forward Link Trilateration (A-FLT); Timing Advance/Network Measurement Report (TA/NMR); and Enhanced Observed Time Difference (E-OTD), although the scope of the disclosure is not limited in this respect.

Initially, the purpose behind the inclusion of any of the above in mobile cell phones was so that the public safety answering point (PSAP) which answers calls to an emergency telephone number can know where the caller may be located and exactly where to send emergency services, although the scope of the disclosure is not limited in this respect. This ability is known within the NANP (North America) as enhanced 911, although the scope of the disclosure is not limited in this respect. Mobile cell phone owners may have the option to permit the location information gathered to be sent to other phone numbers or data networks, so that it may help people who are simply lost or want other location-based services, although the scope of the disclosure is not limited in this respect. This selection may be turned off, to protect privacy, although the scope of the disclosure is not limited in this respect.

As best illustrated in FIG. 1, the system 20 may include a device 22 and may include structure capable of performing the location function should the device 22 become misplaced, lost or stolen, in accordance with some embodiments of the present disclosure. Such devices are known to those skilled in the art and further elaboration on other specific devices is believed unnecessary. For example, U.S. Pat. No. 7,409,219, to Levitan and US Publication Number 2007/0077924, to Bhogal et al., the disclosure of each is hereby incorporated by reference to the extent not inconsistent with the present disclosure, are examples of patents disclosing similar systems and methods, although the scope of the disclosure is not limited in this respect.

The system 20 for locating a device 22 having a communication range and being capable of communicating with a communication structure, such as, for example, communication towers 24 $a$-$c$, the device 22 having the capability of receiving signals from a remote location such that the device 22 may be rendered capable of being remotely located, if misplaced, lost or stolen, although the scope of the disclosure is not limited in this respect. The device 22 may be operatively associated with a numerical code that may be used for locating the device 22 when the device becomes misplaced, lost or stolen such as, for example, in a broad sense the device 22 may be a device capable of sending and receiving wireless signals, although the scope of the disclosure is not limited in this respect. Such devices 22 include, but are not limited to, a cellular telephone, a personal digital assistant (PDA) or a handheld portable communication device, although the scope of the disclosure is not limited in this respect. In some embodiments, the device may be a laptop or portable computer with communication capability, a web tablet, a pager, an instant messaging device, a digital camera, an access point or other device that may receive and transmit information, although the scope of the disclosure is not limited in this respect. In some embodiments, the device may transmit and receive RF communications in accordance with specific communication standards, such as, for example, the Institute of Electrical and Electronics Engineers (IEEE) standards including IEEE 802.11(a), 802.11(b), 802.11(g/h) and 802.11(n) standards for local area networks (WLANs) and 802.42 standards for metropolitan area networks (WMANs), although the communication device may also be suitable to transmit and receive communications in accordance with other techniques including the Digital Video Broadcasting Terrestrial (DVB-T) broadcasting standard, and the High performance radio Local Area Network (HiperLAN) standard, although the scope of the disclosure is not limited in this respect.

In some embodiments, the location capability may include, but not be limited to, mobile radio frequency device (M-RFID), mobile item management and identification system (MMIM), a real time locating system (RTLS), a global positioning system (GPS), or any other location capacity known to those skilled in the art for locating objects using a transmitter, signal and receiver or other navigation or location sensor or locator presently known or becomes known in the future to those skilled in accordance with some embodiments of the present disclosure, although the scope of the disclosure is not limited in this respect.

In some embodiments, the circuitry for performing various operations by device 22 may include a combination of software, firmware and logic circuitry operating with a processing system, as would be understood by those skilled in the art, although the scope of the disclosure is not limited in this respect.

In some embodiments, the device 22 may include, but is not limited to, a cell phone, although other presently known or known in the future electronic devices may be used, although the scope of the disclosure is not limited in this respect. The cell phone may include a voice input/output control, as is known by those skilled in the art, although the scope of the disclosure is not limited in this respect.

In some embodiments, the device 22 may further comprise an antenna 62 coupled to transceiver, although the scope of the disclosure is not limited in this respect. Antenna 62 may comprise a directional or o group unidirectional antenna, including, for example, a dipole antenna, a monopole antenna, a loop antenna, a microstrip antenna or other type of antenna suitable for the transmission and reception of signals, although the scope of the disclosure is not limited in this respect.

In some embodiments, the device 22 may be a battery-powered device, although the scope of the disclosure is not limited in this respect.

Although the device 22 may be illustrated as having several separate functional elements, one or more of the functional elements may be combined and may be implemented by combinations of software-configured elements, such as processing elements including digital signal processors (DSPs), and other hardware elements, although the scope of the disclosure is not limited in this respect. For example, processing elements may comprise one or more microprocessors, DSPs, application specific integrated circuits (ASICs), and combinations of various hardware and logic circuitry for performing at least the functions described herein, although the scope of the disclosure is not limited in this respect.

As mentioned above, FIG. 1 illustrates a representative communications system 20, capable of functioning with the present disclosure, as a geographical area-based communication system including a plurality of communication towers 24 $a$-$c$ are providing communications services to a plurality of devices 22$a$-$b$, such as, for example, cell phones, although the scope of the disclosure is not limited in this respect. Each communication tower 24 $a$-$c$ may have an associated geographical coverage area 30 $a$-$c$ serviced by the respective communication tower 24 $a$-$c$, although the scope of the disclosure is not limited in this respect. Each device 22$a$-$b$ positioned within one of the geographical areas 30$a$-$c$ communicates with the associated communication tower 24 $a$-$c$ by exchanging data packets according to a predetermined digital communications protocol, such as, for example, time division multiple access (TDMA), although the scope of the disclosure is not limited in this respect. In one embodiment, the communications system 20 may be an iDEN network, but it will be appreciated that in alternate embodiments the communications system 20 may support other multiple-access communications protocols, such as, for example, code division multiple access (CDMA), wideband CMDA (WCDMA), Advanced Mobile Phone Service (AMPS), Global System for Mobile Communications (GSM), General Packet Radio Services (GPRS), High Data Rate (HDR) technology, Push-to-Talk over Cellular (PoC) or voice and data services provided over a broadband network such as WiFi, WiMax, any 802 protocol or similar system, although the scope of the disclosure is not limited in this respect.

The communications system 20 facilitates at least one mode of communication such as interconnect, dispatch, email, short messaging service (SMS), multimedia messaging service (MMS) and packet data communications, although the scope of the disclosure is not limited in this respect. Each device 22*a-b* may be any device that may be adapted for communication with the communication tower 24 *a-c* 12*a-c* such as, for example, a mobile phone, pager, personal digital assistant (PDA), a Personal Computer Memory Card International Association (PCMCIA) card, or portable computer or any other device capable of such communications presently known or that should be developed in the future, although the scope of the disclosure is not limited in this respect.

A mobile switching center (MSC) 32 may manage the communications in the geographical areas 30*a-c*, including, but not limited to, call set-up, routing calls between the devices 22*a-b* and routing calls between the devices 22*a-b* and at least one communications network 34, such as, for example, a public switched telephone network (PTSN) or a data network such as the Internet, although the scope of the disclosure is not limited in this respect. It will be appreciated that the communications system 20 in one embodiment may include other iDEN components, including a plurality of MSCs 32, each managing a plurality of geographical areas 30*a-c*, as would be understood by those skilled in the art, although the scope of the disclosure is not limited in this respect.

In one embodiment, each device 22*a-b* may be adapted to determine their respective geographic positions using the Global Positioning System (GPS) operated by the United States Department of Defense, although the scope of the disclosure is not limited in this respect. The GPS may include a network of 24 satellites that orbit the earth in six circular planes, although the scope of the disclosure is not limited in this respect. The GPS satellites may be spaced so that, at any given time and from any geographic position, at least five GPS satellites 36 *a-d* may be above the horizon, although the scope of the disclosure is not limited in this respect. In operation, each GPS satellite continually broadcasts its present position and current time, although the scope of the disclosure is not limited in this respect. Each device 22*a-b* may be equipped with a GPS receiver adapted to extract the information contained in the GPS broadcast signals to compute the device's geographic position in terms of its longitude, latitude and altitude, although the scope of the disclosure is not limited in this respect.

In one embodiment, the GPS receiver may search for and collect the signals broadcast from one or more GPS satellites that are in view, although the scope of the disclosure is not limited in this respect. Next, using the time interval between the broadcast time and reception time of each broadcast signal, the GPS receiver may count delayed the distance between the GPS receiver and each of the identified GPS satellites, although the scope of the disclosure is not limited in this respect. These distance measurements, along with the position and time information received in the broadcast signals and other information known to the device 22*a-b*, such as, for example, a cell phone, may enable the GPS receiver associated with each device 22 *a-b* to calculate the geographic position for each device 22 *a-b*, although the scope of the disclosure is not limited in this respect.

In one embodiment, the device 22*b* may receive position information through the local communication tower 24*b* to assist the device 22*b* in determining its location faster. The communication tower 24*b* which may be located at a fixed, known position, may track the positions of the GPS satellites that are in view and transmit the identities and positions of these GPS satellites, along with other position information such as the associated Doppler frequencies of the broadcast signals, to devices in the communication tower's 24*a-c* geographical coverage area, although the scope of the disclosure is not limited in this respect. The position information enables a GPS warm start by informing the device 22*b* of the approximate location of the GPS satellites to reduce time needed to acquire the GPS broadcast signals, although the scope of the disclosure is not limited in this respect. It will be appreciated that other position determination methods may also be used, including systems that calculate the distances between a device 22 and two or more communication towers 24 *a-c* using the time difference of signals sent between the device and the communication towers 24 *a-c*, as would be understood by those skilled in the art, although the scope of the disclosure is not limited in this respect.

A location server 38 may be connected to the communications system 20 through the communications network 34, although the scope of the disclosure is not limited in this respect. In one embodiment, the location server 38 may be an extension of a home location register (HLR) of the communication system 20, although the scope of the disclosure is not limited in this respect. The location server 38 may include a database 40 which may store location-based data for the devices 22*a-b* on a per owner basis, although the scope of the disclosure is not limited in this respect. A network device 42 may be adapted to communicate with the location server 38 to access the location-based data 40 and available location-based services, although the scope of the disclosure is not limited in this respect. In one embodiment, the location server 38 may include a mobile positioning center and a web server adapted to serve web content to the network device 42 through the Internet, although the scope of the disclosure is not limited in this respect.

In operation, the device 22*b* may include a device location application or program for maintaining in storage a list of locations that may include, but not be limited to, recent locations and the current location of the device, although the scope of the disclosure is not limited in this respect. In one embodiment, the owner may instruct the device 22*b* to determine its current geographic location 50*a* using the GPS satellites 36*a-d*, although the scope of the disclosure is not limited in this respect. The owner may store a plurality of locations 50*a-d* in the device 22*b*, although the scope of the disclosure is not limited in this respect. The stored locations may also be transmitted to the location server 38 and stored in the database 40, although the scope of the disclosure is not limited in this respect. The owner may name each location as desired (e.g., favorite restaurant, home, friend's house) and these locations may be used to provide the subscriber with additional location-based services, although the scope of the disclosure is not limited in this respect. If the device 22*b* may be lost, misplaced or stolen, the network device 42 may be used to access the location server 38 to find the last reported location of the device 22*b*, although the scope of the disclosure is not limited in this respect.

A representative embodiment of a generic MCD 60 will now be described with reference to the block diagram of FIG. 2. The MCD 60 may include at least one antenna 62 adapted to transmit and receive radio frequency (RF) signals or other signals as is known to those skilled in the art, although the scope of the disclosure is not limited in this respect. RF signals may be received by the antenna 62 and may be selectively routed to a GPS receiver 64 and a communications transceiver 66, although the scope of the disclosure is not limited in this respect. The receivers 64 and 66 may be coupled to at least one digital signal processor (DSP) 70, which may control the signal processing of the received GPS satellite signals and communications signals, although the scope of the disclosure is not limited in this respect. The DSP 70 may be coupled to a control processor 72, which may control the operation of the MCD 60, although the scope of the disclosure is not limited in this respect. The DSP 70 and control processor 72 may be implemented as a single processor, a plurality of processors or a combination of processors and dedicated circuitry including application specific integrated circuits (ASICs), although the scope of the disclosure is not limited in this respect. The control processor 72 may be coupled to a timing source 74, which may maintain a local time for the MCD 60, a memory 76, and an owner interface 78, although the scope of the disclosure is not limited in this respect. The memory 76 may include a random access memory and a program memory which may store execution instructions for controlling the DSP 70 and control processor 72, although the scope of the disclosure is not limited in this respect. In one embodiment, the MCD 60 may be an iDEN mobile telephone, and the owner interface 78 may include circuitry and components for providing an owner of the MCD 60 with a numeric keypad for owner input of telephone numbers and other information, and a visual display, as is well known to those skilled in the art, although the scope of the disclosure is not limited in this respect.

The GPS receiver 64 may include circuitry for receiving GPS signals and converting the received GPS signals to digital, although the scope of the disclosure is not limited in this respect. The DSP 70 may be adapted to locate the PN codes in the GPS signals, extract satellite information from the GPS signals, calculate pseudoranges and determine the current geographic position of the MCD 60, although the scope of the disclosure is not limited in this respect. The communications transceiver 66 may include circuitry for receiving communications signals and converting received communications signals to digital for processing by the DSP 70, although the scope of the disclosure is not limited in this respect. The communications transceiver 66 may also include circuitry for converting digital signals to analog and transmitting the analog signals across a wire to a less communications link through the antenna 62, although the scope of the disclosure is not limited in this respect.

In one embodiment, the MCD 60 may be a cell phone and the DSP 70 and control processor 72 may be adapted to process, transmit and receive voice and data communications through the communications transceiver 66, although the scope of the disclosure is not limited in this respect. The MCD 60 may further include a primary power source 80, such as a battery, providing the power to operate the MCD 60, although the scope of the disclosure is not limited in this respect.

In one embodiment, the MCD 60 may include a software application capable of preventing the battery from becoming completely drained before being automatically shut down, i.e., a percentage of the battery charge may be dedicated as a reserve power source should the MCD 60 become misplaced, lost or stolen, although the scope of the disclosure is not limited in this respect. In another embodiment, the MCD 60 may include a secondary power source 81, such as, for example, a smaller battery system. Each of the reserve power source and the secondary power source may be capable of being activated by a signal received by the MCD 60 even when the MCD 60 may be unpowered, i.e. turned off or the battery may be completely discharged except for the reserve power source when applicable, although the scope of the disclosure is not limited in this respect.

The memory 76 may include a GPS directory 82 for the MCD 60, a MCD location application 84 for determining the current location of the MCD 60 and may communicate with a location server 38 (see FIG. 1), and a power management application 86 which may manage the primary power source 80 including the reserve power source and the secondary power source 81, if one is provided, although the scope of the disclosure is not limited in this respect. The GPS directory 82 may include a list of owner stored MCD 60 locations, as is known to those skilled in the art, although the scope of the disclosure is not limited in this respect. In some embodiments, the GPS directory 82 may include a system entry, for storing a most recent location of the MCD 60, although the scope of the disclosure is not limited in this respect. In other embodiments, other information may be included, such as, for example, the location acquisition method and accuracy, for example the number of GPS satellites used to determine the location.

Through the GPS directory 82, the owner of the MCD 60 may build a library of locations with user-friendly names for their own use, although the scope of the disclosure is not limited in this respect. The owner may mark a location by entering a feature code or menu selection from the location application 84 and then adding text to describe the location, although the scope of the disclosure is not limited in this respect. Storing locations may enable the owner to later re-find a stored location, get directions to a stored location, get an address of a previously visited location, and determine services local to the stored location, although the scope of the disclosure is not limited in this respect. Further, this directory may also be stored on the Internet for the owner and may be available through an internet connection, although the scope of the disclosure is not limited in this respect.

Referring back now to FIG. 2, the power management application 86 may include power management software adapted to maximize the operational life of the MCD 60, although the scope of the disclosure is not limited in this respect. A number of techniques may be used for managing the power consumption, as is known to those skilled in the art, although the scope of the disclosure is not limited in this respect. In one embodiment, the power management application 86 may cause the MCD 60 to enter a sleep mode when not in active use and to awaken at pre-determined intervals to check for pages, alerts or other messaging, as is known to those skilled in the art, although the scope of the disclosure is not limited in this respect. The power management application 86 may also cause the MCD 86 to enter into a battery save mode if no service may be available, although the scope of the disclosure is not limited in this respect. Other features may include, but are not limited to, keeping the transmit power to the minimum required strength to preserve battery life and dimming the display and turning off of unneeded indicators when not in use, as is known to those skilled in the art, although the scope of the disclosure is not limited in this respect.

The power management application 86 of the MCD 60 may provide the owner with "low battery" indications as the battery strength may fall below certain "fading" threshold strengths, although the scope of the disclosure is not limited in this respect. If a MCD may be misplaced, lost or stolen, the primary power source battery may eventually run down due to battery exhaust, ceasing operation of the MCD, although the scope of the disclosure is not limited in this respect. In one embodiment, the power management application 86 may include obtaining a final GPS position before primary power source exhaustion for misplaced, lost or stolen MCDs function that may initiate a GPS location determination as the primary power source battery power falls below certain exhaust thresholds, although the scope of the disclosure is not limited in this respect. The final GPS position function may systematically provide the MCD's position to the location server 38 (see FIG. 1) at a time before the exhaust of the primary power source battery, although the scope of the disclosure is not limited in this respect. The location server may store the subscriber's final GPS position in the data storage, although the scope of the disclosure is not limited in this respect. The MCD's velocity and direction of movement may also be stored, although the scope of the disclosure is not limited in this respect. In one embodiment, the final GPS position may also be stored at a location on the network, although the scope of the disclosure is not limited in this respect.

In one embodiment, the operation of the power management application 86 may be designed to assure that the process may be completed prior to the primary power source battery 80 becoming exhausted, although the scope of the disclosure is not limited in this respect. As the primary power source battery 80 of the MCD 60 reaches a last threshold indicating power may be about to be exhausted to the MCD 60, a final GPS position may be determined and stored and transmitted to the Internet-based server which holds the user location information, although the scope of the disclosure is not limited in this respect.

When the MCD's 60 primary power source 80 battery strength drops below about 0.05% to about 5.0%, the MCD 60 may transmit its location to the location server, continually updates its location, and sends the updated position information to the location server 38 if the location changes, although the scope of the disclosure is not limited in this respect. When at a point prior to involuntary shutdown, e.g., the minimum available power that permits the completion of an involuntary shutdown procedure, the MCD 60 may transmit a final position and may refrain from further location processing to preserve the reserve power source or the secondary battery charge, although the scope of the disclosure is not limited in this respect. In another embodiment, the MCD 60 may execute an involuntary shutdown procedure, including deregistration and shifting the power received from the primary power source 80 and any secondary power source 81 to zero, although the scope of the disclosure is not limited in this respect.

Should the MCD 60 become damaged (e.g., the user drops a mobile phone) or if the primary power source battery 80 falls out or the MCD otherwise suddenly loses power, then there would not a chance for a last location process to execute except in the case of the device including a secondary power source 81, although the scope of the disclosure is not limited in this respect. In one embodiment, a position history for the MCD may be maintained and if the last location procedure is not completed, then the position history may be provided to an owner requesting the location of a MCD along with a notification that the location position may not be available, although the scope of the disclosure is not limited in this respect. In another embodiment, an owner may have multiple MCDs (e.g., an email device and a cell phone) and an approximation of the misplaced, lost or stolen MCD's position may be determined using the location of the second device—particularly if the two devices were in the same position when one became unaccounted for and ceased functioning, although the scope of the disclosure is not limited in this respect.

Figure 3:
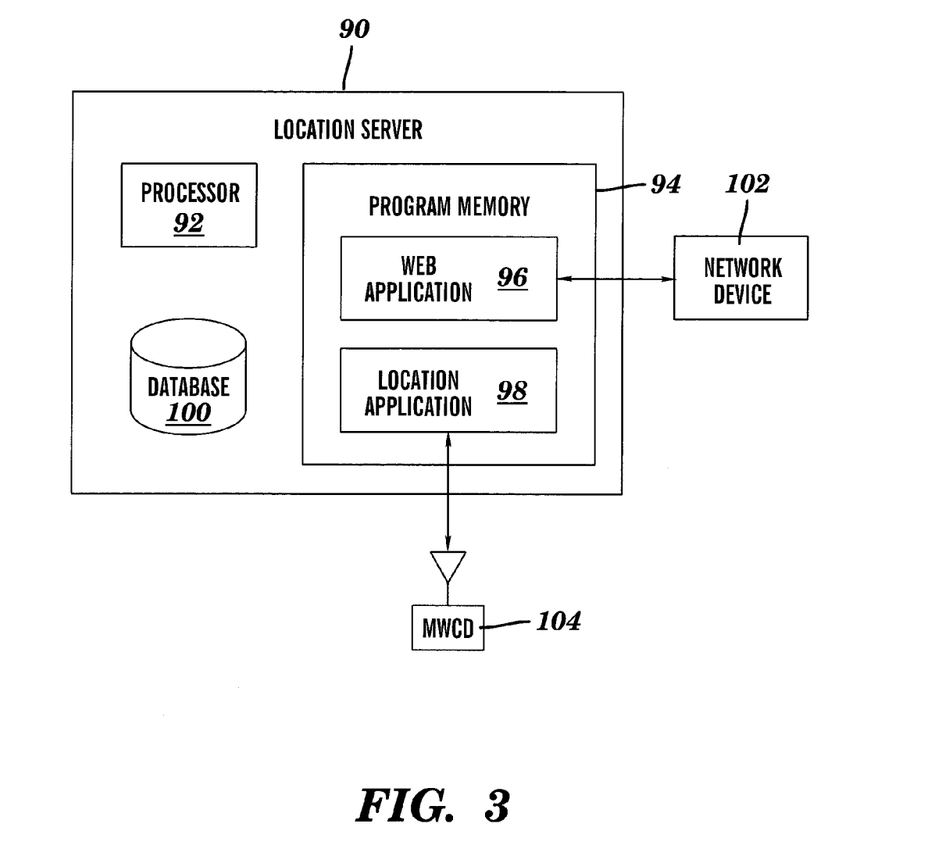
FIG. 3 depicts a block diagram of a representative location server according to one embodiment.

FIG. 3 illustrates one embodiment of a location server 90, according to the present disclosure. The location server 90 may include a processor 92, a memory 94 and a database 100, although the scope of the disclosure is not limited in this respect. The memory 94 may include program instructions for instructing the processor to operate as a web server 96 providing access to web devices such as network device 102, although the scope of the disclosure is not limited in this respect. The memory 94 may also include a location application 98 for instructing the processor 92 to perform location functions as described herein, including providing an interface to a MCD 104, and performing last location functions, although the scope of the disclosure is not limited in this respect.

The database 100 may store location information for the MCD 104 and other MCD s 60 with compatible location-based capabilities, although the scope of the disclosure is not limited in this respect. A location table (not shown) may include a plurality of records, each record identifying the MCD 60, as would be understood by those skilled in the art, although the scope of the disclosure is not limited in this respect. In one embodiment, the location table may include a system entry referred to herein as a last location position entry or any other record identifying protocol known to those skilled in the art, although the scope of the disclosure is not limited in this respect. The last location entry may be a memory location that stores the current location of the MCD 60, although the scope of the disclosure is not limited in this respect. At anytime, when the MCD 60 performs a task that requires GPS location, the determined location may be stored in the last location memory, although the scope of the disclosure is not limited in this respect. Further, each time the MCD 60 may be handed off from one geographical area e to another, the last location may be updated with the known and fixed location of the communications tower which may enable the GPS position to be found more quickly, although the scope of the disclosure is not limited in this respect.

Figure 4:
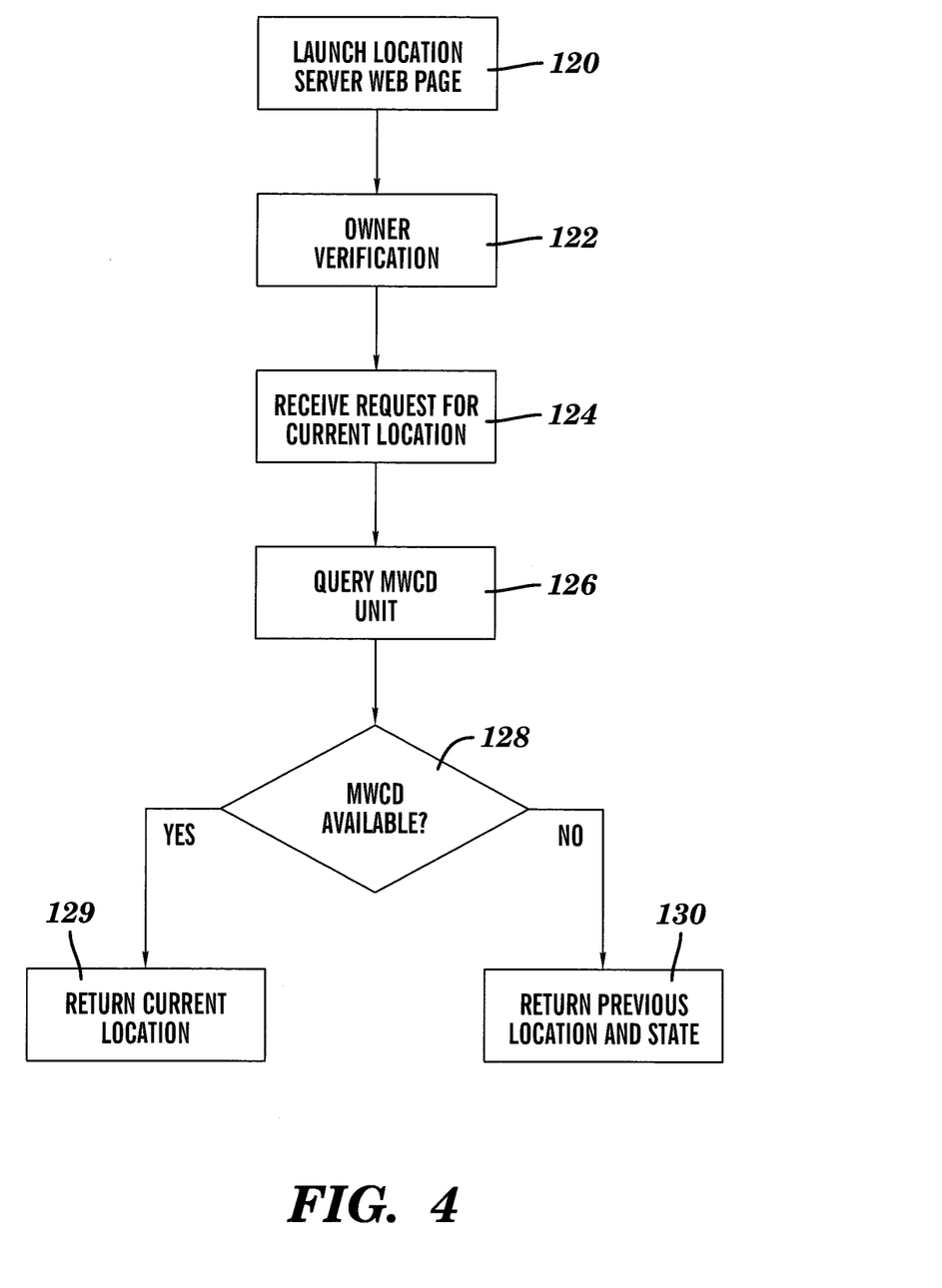
FIG. 4 depicts a flow chart of a web application according to one embodiment.

One representative operation of a location server web interface is illustrated in FIG. 4, although the scope of the disclosure is not limited in this respect. If the MCD 60 is misplaced, lost or stolen, the owner or an authorized representative can go online and determine the last location of the MCD from the last position indicator, although the scope of the disclosure is not limited in this respect. Through the online system, the owner may initiate actions to disable the associated cellular service or attempt to contact the MCD if it is determined that the mobile communication device has not yet powered down, although the scope of the disclosure is not limited in this respect. Further, the owner may manage incoming calls to the misplaced, lost or stolen MCD by instructing the network to forward all incoming calls to an alternate number or to voicemail directly, although the scope of the disclosure is not limited in this respect, By maintaining location data on a per owner basis, an owner may lose a first MCD (e.g., a email MCD) and information on a second MCD may be used to assist with the location of the first MCD, providing that both MCDs were at the same location as one was misplaced, lost or stolen, although the scope of the disclosure is not limited in this respect. Historical information may also be kept for different modes of a dual mode MCDs to track uses on multiple systems (e.g., CDMA and GSM), although the scope of the disclosure is not limited in this respect.

The web application 96 (see FIG. 3) may allow review and editing of stored location information and the determination of the last location of the MCD prior to the primary power source battery exhaust, although the scope of the disclosure is not limited in this respect. The web application 96 may also include functions for storing locations on a quality of location basis, may enable the ringing or alert sound of a MCD (if Howard) from the web and may enable the owner to suspend the associated service and provide a customer announcement when the owner becomes aware of a misplaced, lost or stolen MCD, although the scope of the disclosure is not limited in this respect.

The location server 90 may also enable the owner of another MCD to access the same information via the web or an interactive voice response (IVR) system (which may be associated with the voicemail platform or may be independent), although the scope of the disclosure is not limited in this respect. Via IVR or web application, the owner may suspend its service and provide a custom announcement in the owner's own voice (or default announcement) when a misplaced, lost or stolen MCD may be suspected, although the scope of the disclosure is not limited in this respect.

The owner may access the location server 90 to determine a current location of the MCD, although the scope of the disclosure is not limited in this respect. In one embodiment, an owner operating a network device 42 may access the location server 90 via a web page 120 launched by the web application 96, although the scope of the disclosure is not limited in this respect. In another embodiment, the owner identity may be verified 122, such as through an owner name and password associated with the MCD 60, although the scope of the disclosure is not limited in this respect. These location-based services may be an additional capability added to the carrier's web presence, although the scope of the disclosure is not limited in this respect.

In still another embodiment, a request for the location of an associated MCD 60 may be received from the network device 42 (see FIG. 1), although the scope of the disclosure is not limited in this respect. In yet another embodiment, the a request for current location at 124 may be made of the location application 98 may contact at 126 the MCD 60 via the network in order to determine the MCDs current location at 124, although the scope of the disclosure is not limited in this respect. If the MCD 60 may be available at 128 and operable, the MCD may respond with the MCDs current location 129, which may be displayed on the owner's web browser, although the scope of the disclosure is not limited in this respect.

In another embodiment, if the MCD 60 does not respond at 128, the last location 130 may be returned for the MCD 60, although the scope of the disclosure is not limited in this respect. A location name may be associated with the MCD location may also be displayed for the owner, although the scope of the disclosure is not limited in this respect.

As illustrated in FIGS. 1 and 2, data flow will now be described in greater detail. In one embodiment, the MCD 22*b* at a location 50*a* initiates the last location application 84 resident on the MCD 22*b* to determine the current location 50*a*, although the scope of the disclosure is not limited in this respect. The location application 84 may determine the location of the MCD 22*b* and may store that location in a local GPS directory 82, although the scope of the disclosure is not limited in this respect. The owner may specify a name for the location 50*a* (e.g., my office). The location information may also be stored in the MCD's last location entry and forwarded to the location server 38 via the MSC 32, or any other device capable of performing the same function now known or should become known to those skilled in the art, although the scope of the disclosure is not limited in this respect.

The owner may access the stored locations from the MCD 22*a*, or from the location server 38 via a public Internet and the secure website, although the scope of the disclosure is not limited in this respect. The owner may modify, delete or forward the information to others as desired, although the scope of the disclosure is not limited in this respect. In one embodiment, the location information stored in the location server 38 may be downloaded to one or more MCD in order to repopulate the MCD's memory with the stored location information, although the scope of the disclosure is not limited in this respect.

If the MCDs 22*b* primary power source battery should become nearly discharged, MCD may initiate the last location procedure as the primary power source battery power level drops, although the scope of the disclosure is not limited in this respect. Before the primary power source battery power may be exhausted, the MCD's current location may be provided to the location server 38, although the scope of the disclosure is not limited in this respect.

When the owner realizes that the MCD 22*b* may be misplaced, lost or stolen, the owner may access the location server 38, and may provide an owner name and password and may select a "lost phone" option, although the scope of the disclosure is not limited in this respect. In one embodiment, the identity of the owner may be further authenticated to ensure that the owner may be authorized to locate the MCD 22*b*, although the scope of the disclosure is not limited in this respect.

If the primary power source battery 80 may be still operable, the location server 38 may transmit an instruction to the MCD 22 *b* to update and return its current location, although the scope of the disclosure is not limited in this respect. Otherwise, the owner may be shown the last location of the device 22*b* as stored in the last location entry, although the scope of the disclosure is not limited in this respect. The MCD location may be shown as a GPS position and, if the owner has previously stored this location, the location may be provided as a "user friendly name" associated with that location, although the scope of the disclosure is not limited in this respect.

Through the misplaced, lost or stolen MCD location application 84, the owner may be provided with a number of options, although the scope of the disclosure is not limited in this respect. In one embodiment, the owner may elect to temporarily suspend service to the MCD and direct all incoming calls to voicemail until the owner recovers the MCD, although the scope of the disclosure is not limited in this respect. In another embodiment, once the location of the MCD may be determined, the location server may instruct the MCD to play intermittently an audible ring tone or alert until the owner finds the MCD and presses "end," the MCD loses power, or the owner cancels the audible ring turned or alert request, although the scope of the disclosure is not limited in this respect.

If the MCD may be in a powered on condition, the MCD may be directed into sleep mode or power off mode, although the scope of the disclosure is not limited in this respect. Other embodiments that are presently envisioned, include, but not limited to, the ability for the owner to redirect incoming calls to another MCD until the MCD may be recovered, change the owner profile to a hotline mode so that any attempts at communication with the MCD are directed to a desired number notifying the caller that the MCD may be lost and providing instructions on how to return the MCD, although the scope of the disclosure is not limited in this respect. The owner may also permanently disassociate the service with the MCD and notify the communications system 20 of the misplaced, lost or stolen MCD, although the scope of the disclosure is not limited in this respect.

In one specific embodiment, a representative MCD having location systems and methods, according to the present disclosure, will now be described. In one embodiment, the primary power source 80 of the MCD may be partitioned such that a certain percentage of the stored power may be dedicated to the situation where the representative MCD may have been misplaced, lost or stolen, although the scope of the disclosure is not limited in this respect. In some embodiments, once it has been determined by the owner that the device may be apparently misplaced, lost or stolen, the owner may first initiate efforts to locate the MCD by simply attempting to directly contact the subject MCD, although the scope of the disclosure is not limited in this respect.

In some embodiments, these efforts may comprise, among other efforts, contacting the subject device and, if a cell phone, listening for sounds emitting from the cell phone, although the scope of the disclosure is not limited in this respect. In some embodiments, assuming that no sounds are detected in the immediate area which may be emanating from the subject device, the owner may then attempt to directly contact the subject device and activate any one of a possible plurality of location systems and methods resident on the subject device, although the scope of the disclosure is not limited in this respect. In representative embodiments, if the subject device may have a source of power dedicated to responding to an inquiry concerning the subject device's location, the owner may contact the subject device and activate a resident location application 84 thereon, although the scope of the disclosure is not limited in this respect. In the case that the primary power source for the subject device has become exhausted, the owner may remotely, activate the reserve power portion of the primary power source 80 or the secondary power source 81 to determine the exact location of the subject device, although the scope of the disclosure is not limited in this respect.

In the event that the subject device has been stolen, the owner may activate the portion of the resident location application 84 capable of providing the location information to the owner without a third-party, that may be in possession of and operating the subject device, being aware that the location application 84 had been remotely, independently activated such that the current location of the subject device may be transmitted to the owner via the communications network 20, although the scope of the disclosure is not limited in this respect.

In embodiments having a secondary power source 81 or a reserve power source each controllable independently of the primary power source 80, once the owner has reason to believe that the subject device may be in the possession of another party and the owner does not want the other party to know that the owner has contacted the subject device, the owner may remotely, contact the subject device and activate the reserve power source or the secondary power source 81, although the scope of the disclosure is not limited in this respect. The reserve power source or the secondary power source 81 may then activate the location application 84 resident thereon and the location of the subject device may be transmitted to the owner, although the scope of the disclosure is not limited in this respect.

In the event that the subject device most likely has been stolen, the owner may activate the portion of the resident location application 84 capable of providing location information to the owner without a third-party, that may be in possession of and operating the subject device, being aware that the location application 84 was being remotely, independently controlled such that the current location of the subject device was independently transmitted to the owner, although the scope of the disclosure is not limited in this respect.

In any of the above scenarios, the location methods described function independently of whether the subject device may be turned on or off, has sufficient available primary power to operate normally or apparently has insufficient available power to operate at all, although the scope of the disclosure is not limited in this respect. Since the reserve power source and the secondary power source 81 are not readily apparent to a third-party because, once activated, these power sources function independently and concurrently with the primary functioning of the subject device, a third-party that has stolen the subject device may not know that the device itself had sent its present location to the owner for retrieval thereof, although the scope of the disclosure is not limited in this respect.

Operational Example

Figure 5A:
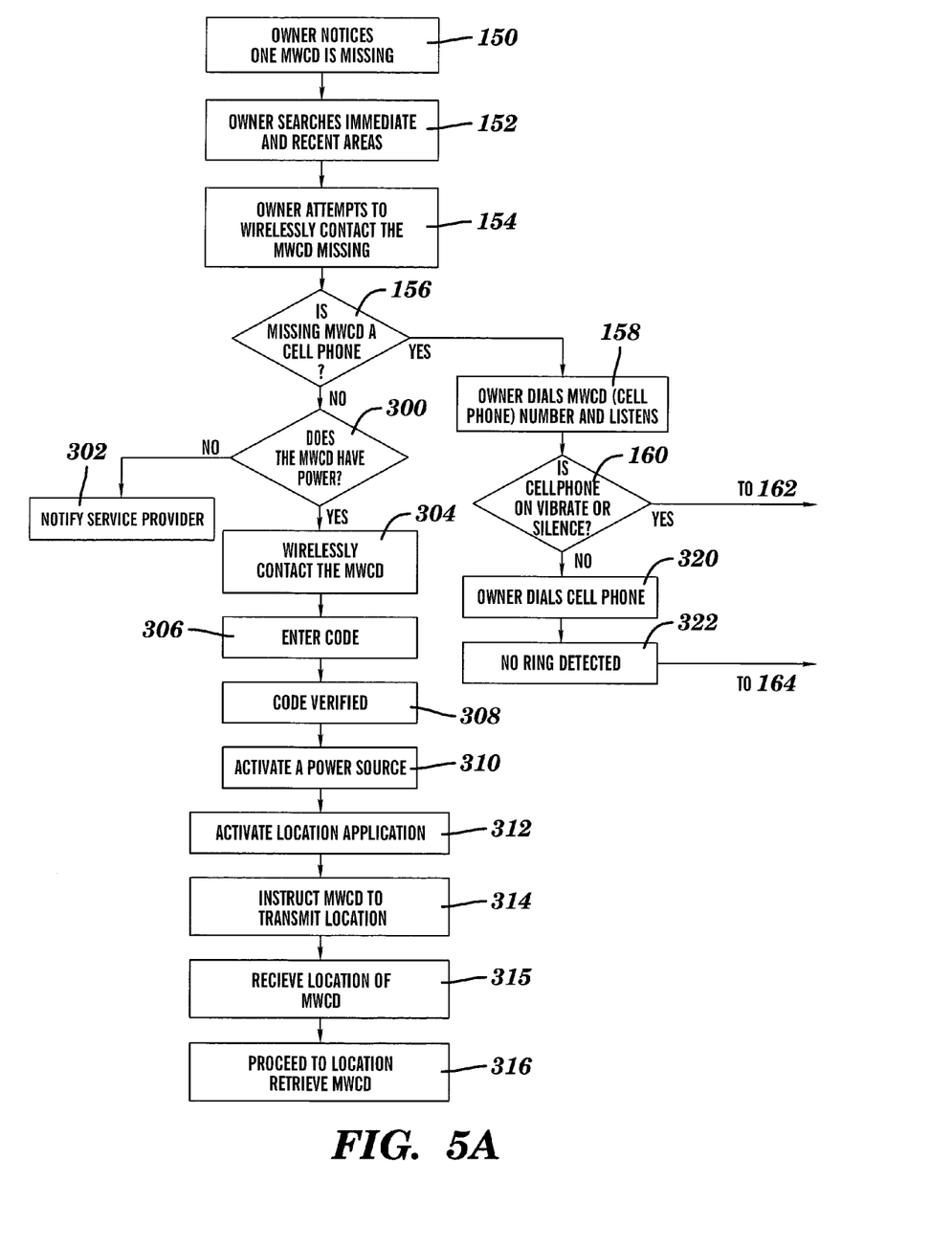
FIG. 5A depicts a flow chart of a device initialization procedure according to one embodiment.
Figure 5B:
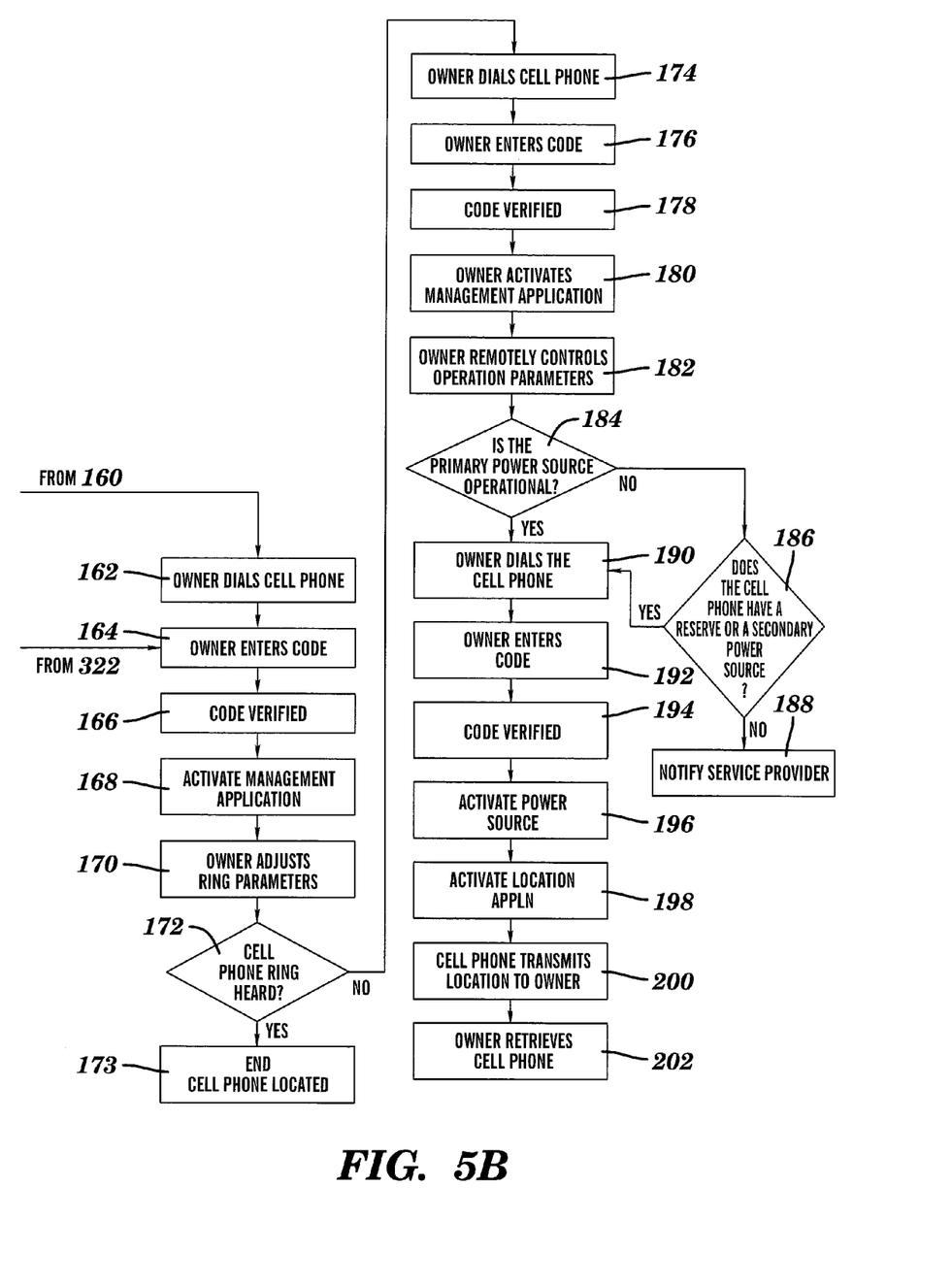
FIG. 5B depicts a continuation of the flow diagram of FIG. 5A according to one embodiment.

FIG. 5A-B illustrates one possible approach to locating a misplaced, lost or stolen MCD, although the scope of the disclosure is not limited in this respect.

The owner notices that at least one of his or her MCDs may be missing at step 150, although the scope of the disclosure is not limited in this respect. The owner searches the immediate area and other areas where he or she may have recently been in possession of the MCD at step 152, although the scope of the disclosure is not limited in this respect. After exhausting the immediate possible locations, the owner of the MCD attempts to communicate with the device at step 154, although the scope of the disclosure is not limited in this respect.

If the misplaced lost or stolen device is a cell phone at step 156, the owner would dial the misplaced lost or stolen cell phones number and listen for the ring at step 158, although the scope of the disclosure is not limited in this respect. If the owner had placed the cell phone on vibrate or silent at step 160, the owner would then dial the cell phone at step 162, enter a code at step 164 that, once verified at step 166, would activate a management application at step 168 that would enable the owner to remotely control the various operational modes of the cell phone, although the scope of the disclosure is not limited in this respect. One possible operational mode would be to change the ring parameter at step 170 such that the ring volume was adjusted to maximum so that persons nearest the cell phone would be able to hear the ring and recover the cell phone, although the scope of the disclosure is not limited in this respect.

If the ring volume change proved unsuccessful at step 172, the owner would again dial the misplaced, lost or stolen cell phone number at step 174, enter a code at step 176 that, once verified at step 178, would again activate the management application at step 180 that would enable the owner to remotely control the various operational modes at step 182 of the cell phone, although the scope of the disclosure is not limited in this respect. At this point, depending upon various factors, including but not limited to, whether or not the cell phone primary power source was operational at step 184, whether or not the cell phone was in the power on or power off position and whether or not the cell phone had a reserve power source and a secondary power source available capable of being remotely controlled and capable of activating a location application resident on the cell phone at step 186, although the scope of the disclosure is not limited in this respect.

If the misplaced, lost or stolen cell phone did not have this remote control capability, then the owner would notify the cell phone service provider that the phone was lost or stolen and request that they cell phone service provider take appropriate action to ensure that no additional cost or incurred by the owner relative to the specific lost or stolen cell phone at step 188, although the scope of the disclosure is not limited in this respect.

If, on the other hand, the misplaced, lost or stolen cell phone had any of the above possible capabilities of being remotely controlled, the owner would contact the cell phone at step 190, enter a code at step 192, receive code verification at step 194, and activate any one of the primary power source, the reserve power source and the secondary power source at step 196, although the scope of the disclosure is not limited in this respect. Once power was established, the owner would instruct the cell phone to activate a location application at step 198 and transmit the location of the cell phone to the owner at step 200, although the scope of the disclosure is not limited in this respect.

If the misplaced, lost or stolen cell phone was concurrently being used by another party, the location application 84 would operate independently of the normal cell phone operation and would independently transmit the location of the cell phone to the owner such that a person operating the cell phone would be unaware of the location application 84 activity, although the scope of the disclosure is not limited in this respect.

Once the cell phone location was established, the cell phone owner or his or her designated representative would proceed to the transmitted location to retrieve the cell phone at step 202, although the scope of the disclosure is not limited in this respect.

In the event that the cell phone location was in transit during this time, the resident location application would continue to transmit the latest cell phone location at a specific time interval, such as, for example, every minute, five minutes, 10 minutes, etc. these updated locations would be ly transmitted to the owner who would then adjust the cell phone retrieval action plan, although the scope of the disclosure is not limited in this respect. Again, these transmissions would take place automatically, independently of the normal cell phone operation in such a manner that a third-party would be completely unaware that the cell phone location was being transmitted, although the scope of the disclosure is not limited in this respect.

Once the cell phone was retrieved by the owner or his or her designated representative, the cell phone would continue in normal operation, although the scope of the disclosure is not limited in this respect.

If the misplaced lost or stolen device is not a cell phone, the actions described above except those specific to a cell phone would be conducted by the owner, although the scope of the disclosure is not limited in this respect. If the device were not located after a thorough search of the various potential locations, depending upon various factors, including but not limited to, whether or not the devices primary power source was operational, whether or not the device was in the power on or power off position and whether or not the device had a reserve power source and a secondary power source available capable of being remotely controlled and capable of activating a location application resident on the device, although the scope of the disclosure is not limited in this respect.

As with the cell phone, if the misplaced, lost or stolen device did not have sufficient power to activate the remote control capability at step 300, then the owner would notify the device service provider that the phone was lost or stolen and request that they cell phone service provider take appropriate action to ensure that no additional cost or incurred by the owner relative to the specific lost or stolen device at step 302, although the scope of the disclosure is not limited in this respect.

If, on the other hand, the misplaced, lost or stolen device had any of the above possible capabilities of being remotely controlled, the owner would contact the device at step 304, enter a code at step 306, receive code verification at step 308, and activate any one of the primary power source 80, the reserve power source and the secondary power source 81 at step 310, although the scope of the disclosure is not limited in this respect. Once power was established, the owner would instruct the device to activate a location application at step 312 and instruct the device to transmit the location of the device to the owner at step 314, although the scope of the disclosure is not limited in this respect.

If the misplaced, lost or device phone was concurrently being used by another party, the location application 84 would operate independently of the normal device operation and would independently transmit the location of the device to the owner such that a person operating the device would be unaware of the location application activity, although the scope of the disclosure is not limited in this respect.

Once the device location was received at step 315, the device owner or his or her designated representative would proceed to the transmitted location to retrieve the device at step 316, although the scope of the disclosure is not limited in this respect.

In the event that the device location was in transit during this time, the resident location application would continue to transmit the latest device location at a specific time interval, such as, for example, every minute, five minutes, 10 minutes, etc., although the scope of the disclosure is not limited in this respect. These updated locations would be transmitted to the owner who would then adjust the device retrieval action plan, although the scope of the disclosure is not limited in this respect. Again, these transmissions would take place automatically, independently of the normal device operation in such a manner that a third-party would be completely unaware that the device location was being transmitted, although the scope of the disclosure is not limited in this respect.

Once the device was retrieved by the owner or his or her designated representative, the owner would continue to normally use the device, although the scope of the disclosure is not limited in this respect.

Having thus described various embodiments of the present disclosure, it should be apparent to those skilled in the art that certain advantages of the within described system have been achieved. It should also be appreciated that various modifications, adaptations, and alternative embodiments thereof may be made within the scope and spirit of the present disclosure.

The Abstract is provided to comply with 37 C.F.R. Section 1.38(*b*) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, disclosure may lie in less than all features of a single disclosed embodiment. Thus the following claims are hereby incorporated into the detailed description, with each claim standing on its own as a separate preferred embodiment.

What is claimed is:

1. A method for locating a mobile device comprising:
   activating a management application such that an owner is enabled to remotely control an operational mode of the mobile device, the operational mode of the mobile device being a ring volume so that the owner can control the ring volume of the mobile device to increase a chance of locating and retrieving the mobile device by hearing a ring of the mobile device in a location of the mobile device when the mobile device receives a verified call from the owner of the mobile device;
   if the mobile device is not located or retrieved in the location, then remotely re-activating the management application to determine whether at least one of a primary power source and a reserve power source is operational to activate a location application on the mobile device independent of a normal operation of the mobile device;
   if at least one of the primary source and the reserve power source is operational, then remotely activating at least one of the primary power source and the reserve power, and activating a location application on the mobile device, after a verification process is performed to determine if the owner of the mobile device is activating the location application;
   obtaining a location of the mobile device with the location application; and
   transmitting the location of the mobile device to the owner for retrieval of the mobile device by the owner.

2. The method of claim 1, further comprising:
   independently transmitting the location of the mobile device to the owner such that a person operating the mobile device would be unaware that the location application had transmitted the mobile device location.

3. The method of claim 2, further comprising:
   transmitting the location at a specific time interval.

4. The method of claim 3, wherein the specific time interval is selected from the group comprising:
   less than a minute, every minute, five minutes, 10 minutes, 15 minutes or more than 15 minutes.

5. The method of claim 1, further comprising:
   automatically, transmitting the mobile device location independently of a normal operation mode in such a manner that a party using mobile device is completely unaware that the mobile device location was being transmitted.

* * * * *